(12) United States Patent
Ionel et al.

(10) Patent No.: US 7,923,881 B2
(45) Date of Patent: Apr. 12, 2011

(54) INTERIOR PERMANENT MAGNET MOTOR AND ROTOR

(75) Inventors: Dan M. Ionel, Fox Point, WI (US); Stephen J. Dellinger, Houston, OH (US); Alan E. Lesak, Franklin, WI (US); Jeremiah Mattingly, Medway, OH (US)

(73) Assignee: A.O. Smith Corporation, Milwaukee, WI (US)

( * ) Notice: Subject to any disclaimer, the term of this patent is extended or adjusted under 35 U.S.C. 154(b) by 271 days.

(21) Appl. No.: 12/114,460

(22) Filed: May 2, 2008

(65) Prior Publication Data

US 2008/0272667 A1    Nov. 6, 2008

Related U.S. Application Data

(60) Provisional application No. 60/916,031, filed on May 4, 2007.

(51) Int. Cl.
*H02K 21/12* (2006.01)
(52) U.S. Cl. ......... 310/156.83; 310/156.78; 310/156.79; 310/156.81; 310/156.84; 310/156.53; 310/156.54; 310/156.56; 310/156.57
(58) Field of Classification Search ............. 310/156.83, 310/156.81, 156.78, 156.84, 156.53, 156.54, 310/156.56, 156.57; *H02K 21/12*
See application file for complete search history.

(56) References Cited

U.S. PATENT DOCUMENTS

| | | | |
|---|---|---|---|
| 2,643,350 A | 6/1953 | Merrill | |
| 2,927,229 A | 3/1960 | Merrill | |
| 3,157,809 A | 11/1964 | Bekey | |
| 3,492,520 A | 1/1970 | Yates | |
| 4,139,790 A * | 2/1979 | Steen | 310/156.83 |
| 4,322,648 A | 3/1982 | Ray et al. | |
| 4,324,996 A | 4/1982 | Adelski et al. | |
| 4,358,696 A * | 11/1982 | Liu et al. | 310/156.56 |

(Continued)

FOREIGN PATENT DOCUMENTS

JP    2001037126 A    2/2001

(Continued)

OTHER PUBLICATIONS

Finite Element Analysis of Brushless DC Motors for Flux Weakening Operation, Dan M. Ionel et al., Research Institute for Electrical Machines, University of Bath, Sep. 5, 1996.

(Continued)

*Primary Examiner* — Quyen Leung
*Assistant Examiner* — John K Kim
(74) *Attorney, Agent, or Firm* — Michael Best & Friedrich LLP

(57) ABSTRACT

An electric machine includes a stator and a rotor core positioned adjacent the stator and rotatable about a longitudinal axis. The rotor core includes a plurality of bar apertures, a plurality of elongated flux barriers separate from the bar apertures and positioned radially inward of the bar apertures, and a plurality of magnet slots separate from the bar slots and positioned radially inward of a portion of the bar apertures. The electric machine also includes a plurality of magnets, each positioned in one of the magnet slots. A plurality of conductive bars are each positioned in one of the bar apertures and includes a first end and a second end. A first end ring is coupled to the first end of each of the bars and a second end ring is coupled to the second end of each of the bars.

20 Claims, 14 Drawing Sheets

U.S. PATENT DOCUMENTS

| | | | |
|---|---|---|---|
| 4,476,408 A | 10/1984 | Honsinger | |
| 4,486,678 A | 12/1984 | Olson | |
| 4,568,846 A | 2/1986 | Kapadia | |
| 4,658,165 A | 4/1987 | Vanderschaeghe | |
| 4,672,253 A | 6/1987 | Tajima et al. | |
| 4,742,258 A | 5/1988 | Earle et al. | |
| 4,795,936 A | 1/1989 | Crosetto et al. | |
| 4,841,186 A | 6/1989 | Feigel et al. | |
| 4,845,837 A * | 7/1989 | Lloyd | 29/598 |
| 4,922,152 A | 5/1990 | Gleghorn et al. | |
| 5,097,166 A * | 3/1992 | Mikulic | 310/156.83 |
| 5,250,867 A | 10/1993 | Gizaw | |
| 5,369,325 A | 11/1994 | Nagate et al. | |
| 5,672,926 A | 9/1997 | Brandes et al. | |
| 5,731,647 A | 3/1998 | Schuller et al. | |
| 6,008,559 A | 12/1999 | Asano et al. | |
| 6,218,753 B1 | 4/2001 | Asano et al. | |
| 6,329,734 B1 | 12/2001 | Takahashi et al. | |
| 6,340,857 B2 | 1/2002 | Nishiyama et al. | |
| 6,353,275 B1 | 3/2002 | Nishiyama et al. | |
| 6,486,581 B2 | 11/2002 | Miyashita et al. | |
| 6,525,442 B2 | 2/2003 | Koharagi et al. | |
| 6,664,688 B2 | 12/2003 | Naito et al. | |
| 6,700,270 B2 | 3/2004 | Yanashima et al. | |
| 6,717,314 B2 | 4/2004 | Horst et al. | |
| 6,727,623 B2 | 4/2004 | Horst et al. | |
| 6,727,627 B1 | 4/2004 | Sasaki et al. | |
| 6,734,592 B2 | 5/2004 | Tajima et al. | |
| 6,737,783 B2 | 5/2004 | Yanashima et al. | |
| 6,781,274 B2 * | 8/2004 | Lee | 310/216.004 |
| 6,794,784 B2 | 9/2004 | Takahashi et al. | |
| 6,844,652 B1 | 1/2005 | Chu et al. | |
| 6,849,981 B2 | 2/2005 | Kojima et al. | |
| 6,876,117 B2 | 4/2005 | Tajima et al. | |
| 6,876,119 B2 | 4/2005 | Sasaki et al. | |
| 6,891,300 B2 | 5/2005 | Noda et al. | |
| 6,917,133 B2 | 7/2005 | Koharagi et al. | |
| 6,946,766 B2 | 9/2005 | Gary et al. | |
| 6,987,341 B2 | 1/2006 | Chang et al. | |
| 7,038,345 B2 | 5/2006 | Fratta | |
| 7,095,152 B2 | 8/2006 | Weihrauch | |
| 7,105,971 B2 | 9/2006 | Asai et al. | |
| 7,112,908 B2 * | 9/2006 | Takita et al. | 310/211 |
| 7,183,685 B2 | 2/2007 | Weihrauch | |
| 7,183,686 B2 | 2/2007 | Sasaki et al. | |
| 7,233,090 B2 | 6/2007 | Evans et al. | |
| 7,282,827 B2 | 10/2007 | Futami | |
| 2003/0071533 A1 | 4/2003 | Kikuchi et al. | |
| 2004/0169431 A1* | 9/2004 | Sasaki et al. | 310/211 |
| 2005/0121991 A1* | 6/2005 | Sasaki et al. | 310/156.78 |
| 2005/0269888 A1* | 12/2005 | Utaka | 310/156.53 |
| 2006/0028082 A1 | 2/2006 | Asagara et al. | |
| 2007/0132330 A1 | 6/2007 | Fei et al. | |
| 2007/0138893 A1 | 6/2007 | Son | |
| 2007/0138894 A1 | 6/2007 | Shin | |
| 2007/0145851 A1 | 6/2007 | Kikuchi et al. | |
| 2007/0152527 A1 | 7/2007 | Yura et al. | |
| 2007/0252467 A1 | 11/2007 | Hoemann et al. | |
| 2008/0272667 A1* | 11/2008 | Ionel et al. | 310/156.83 |

FOREIGN PATENT DOCUMENTS

| | | |
|---|---|---|
| JP | 2003018776 A | 1/2003 |
| JP | 2003-189518 A | 7/2003 |
| WO | 2004075378 A1 | 9/2004 |

OTHER PUBLICATIONS

Finite Element Analysis of an Interior-Magnet Brushless D.C. Machine, with a Step=Skewed Rotor, Eastham et al., University of Bath, Mar. 2, 1997.

Design Considerations for Permanent Magnet Synchronous Motors for Flux Weakening Applications, Ionel et al., May 1, 1998.

U.S. Appl. No. 12/050,087, filed Mar. 17, 2008.

* cited by examiner

US 7,923,881 B2

INTERIOR PERMANENT MAGNET MOTOR AND ROTOR

RELATED APPLICATION DATA

The present application claims the benefit of co-pending provisional patent application Ser. No. 60/916,031, filed May 4, 2007, the subject matter of which is hereby fully incorporated by reference.

BACKGROUND

The present invention relates to a rotor for an electric machine. More particularly, the invention relates to an interior (or internal) permanent magnet electric machine that in one embodiment provides line-start capability.

Permanent magnet synchronous motors with line-start capability include a stator and a rotor, both of which are similar to those of an induction motor and, additionally, include at least one permanent magnet in the rotor.

Line-start permanent magnet (PM) synchronous motors, also referred to as line-fed PM synchronous electrical machines, employ a rotor winding (e.g., a squirrel cage) for torque production during motor start-up and asynchronous speed operation. At synchronous speed, the rotor permanent magnets provide field excitation and contribute to the electromagnetic synchronous torque.

Main challenges that limit the use of the line-start PM synchronous motor include the cost, which is mainly associated with the high-energy rare-earth magnets, such as NdFeB, the starting capability, especially for motors supplied from a single-phase power line and driving loads with a substantial low speed-torque, such as, for example reciprocating compressors, and manufacturing issues, such as effective means of holding the magnets in the rotor body, especially in hermetic applications.

SUMMARY

The invention provides an internal permanent magnet motor with line-start capability.

In one aspect, the invention provides an electric machine that includes a stator and a rotor core positioned adjacent the stator and rotatable about a longitudinal axis. The rotor core includes a plurality of bar apertures, a plurality of elongated flux barriers separate from the bar apertures and positioned radially inward of the bar apertures, and a plurality of magnet slots separate from the bar slots and positioned radially inward of a portion of the bar apertures. The electric machine also includes a plurality of magnets, each positioned in one of the magnet slots. A plurality of conductive bars are each positioned in one of the bar apertures and includes a first end and a second end. A first end ring is coupled to the first end of each of the bars and a second end ring is coupled to the second end of each of the bars.

In another aspect, the invention provides a electric machine that includes a stator and a rotor core positioned adjacent the stator and rotatable about a longitudinal axis. The rotor core defines an inter polar axis and a center pole axis that is oriented at about 90 electrical degrees with respect to the inter polar axis. A plurality of first bars is each positioned within one of a plurality of first bar apertures formed in the rotor core. Each of the bars extends in a direction substantially parallel to the longitudinal axis and includes a first end and a second end. A plurality of second bars different than the first bars are each positioned within one of a plurality of second bar apertures formed in the rotor core. A portion of the second bars are positioned on one of the inter polar axis and the center pole axis. Each of the bars extends in a direction substantially parallel to the longitudinal axis and includes a first end and a second end. A plurality of magnet slots is formed as part of the rotor core and positioned radially inward of the first bar apertures. The second bar apertures extend between adjacent magnet slots. The first bar apertures and the second bar apertures are separate from the magnet slots and a plurality of magnets are each disposed in one of the magnet slots.

In yet another aspect, the invention provides an electric machine that includes a stator and a plurality of rotor laminations stacked along a longitudinal axis and positioned adjacent the stator. The plurality of laminations being rotatable about the longitudinal axis. Each lamination includes a plurality of bar apertures, a plurality of elongated flux barriers separate from the bar apertures and positioned radially inward of a portion of the bar apertures, and a plurality of magnet slots separate from the bar apertures and positioned radially inward of a portion of the bar apertures. A plurality of magnets are each positioned in one of the magnet slots and a first end lamination that is substantially the same as each of the plurality of rotor laminations is positioned adjacent a first end of the plurality of laminations and rotated about the longitudinal axis such that the magnet slots of the first end lamination are misaligned with respect to the magnet slots of the plurality of rotor laminations and the bar apertures are aligned. A second end lamination that is substantially the same as the first end lamination is positioned adjacent a second end of the plurality of laminations and rotated about the longitudinal axis such that the magnet slots of the second end lamination are misaligned with respect to the magnet slots of the plurality of rotor laminations and the bar apertures are aligned.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. In addition, where a method, process, or listing of steps is provided, the order in which the method, process, or listing of steps is presented should not be read as limiting the invention in any way.

Figure 1:
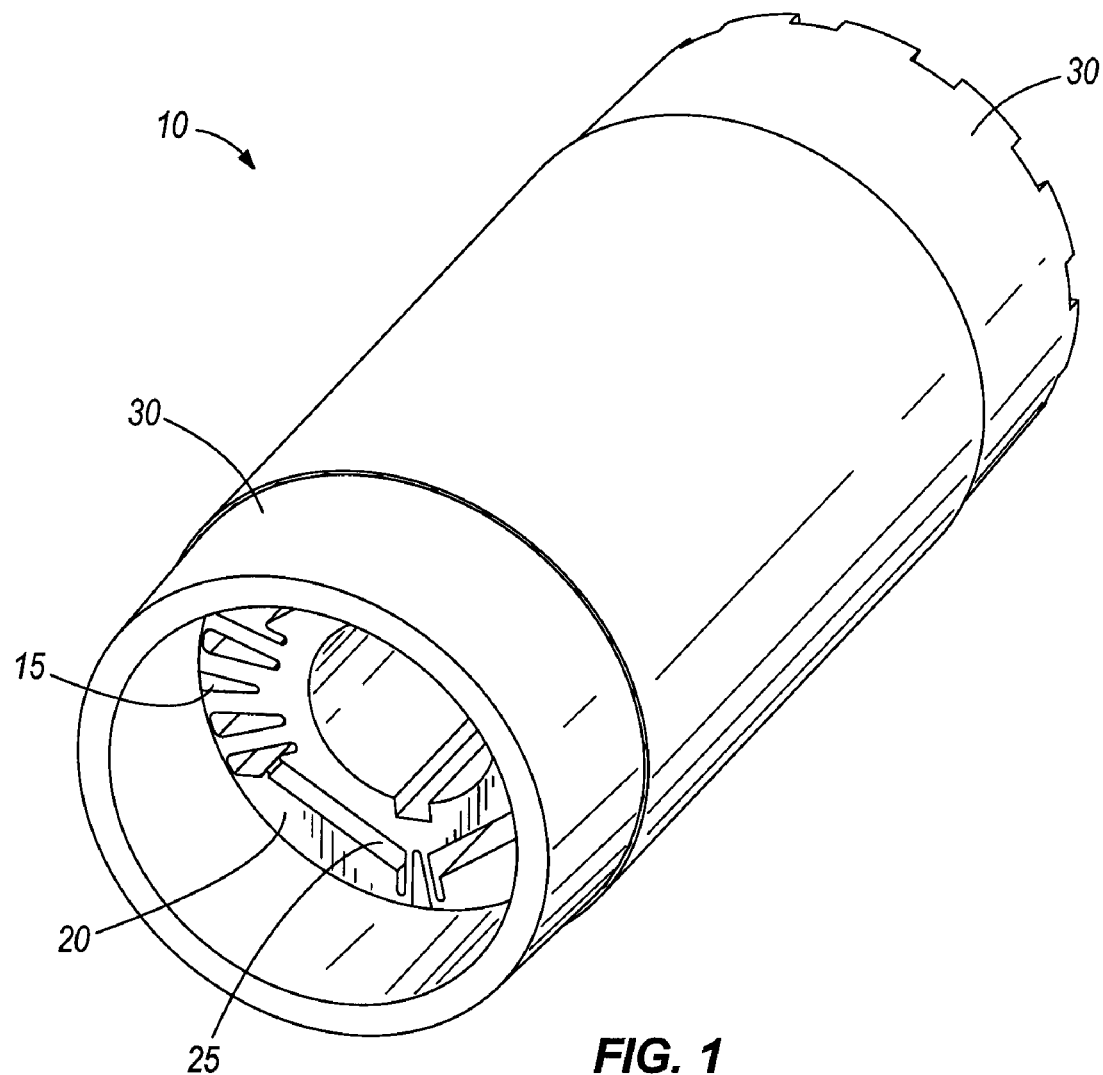
FIG. 1 is a perspective view of a rotor body for a line-start permanent magnet synchronous motor embodying the invention.

FIG. 1 shows a motor 500 that receives power from a power source 580. The power source can be, for example, a 230 VAC power source or a 115 VAC power source depending on the application. The motor 500 includes a motor housing 620. Although the motor 500 is shown to have a single housing, other types of housing (such as an open-frame housing) can be used. Generally, the motor housing 620 directly houses and supports a stator 640 and a rotor or rotor body 10. The rotor body 10 is coupled to or interconnected with a shaft 700, which extends from or through the motor housing 620. One or more bearings 720 supported by the motor housing 620 supports the shaft 700. The shaft 700 also defines an axis 740 such that the shaft 700 extends beyond the motor housing 620 in an axial direction. The stator 640 is at least partially disposed within the motor housing 620 and is supported by the motor housing 620. When energized, the rotor 660 magnetically interacts with the stator 640. Other motor constructions, such as stator and rotor kits for hermetic compressors are also possible and fall within the scope of the invention.

FIG. 1 illustrates a rotor body 10 that is suitable for use in a line-start permanent magnet synchronous motor (LSPMS motor). The rotor body 10 includes a rotor squirrel cage 15 or bar cage, a plurality of laminations 20, and a plurality of permanent magnets 25. The plurality of laminations 20 is sometimes referred to herein as a rotor core. In other constructions, the rotor core is formed from a single component such as a powdered metal component rather than laminations.

Figure 2:
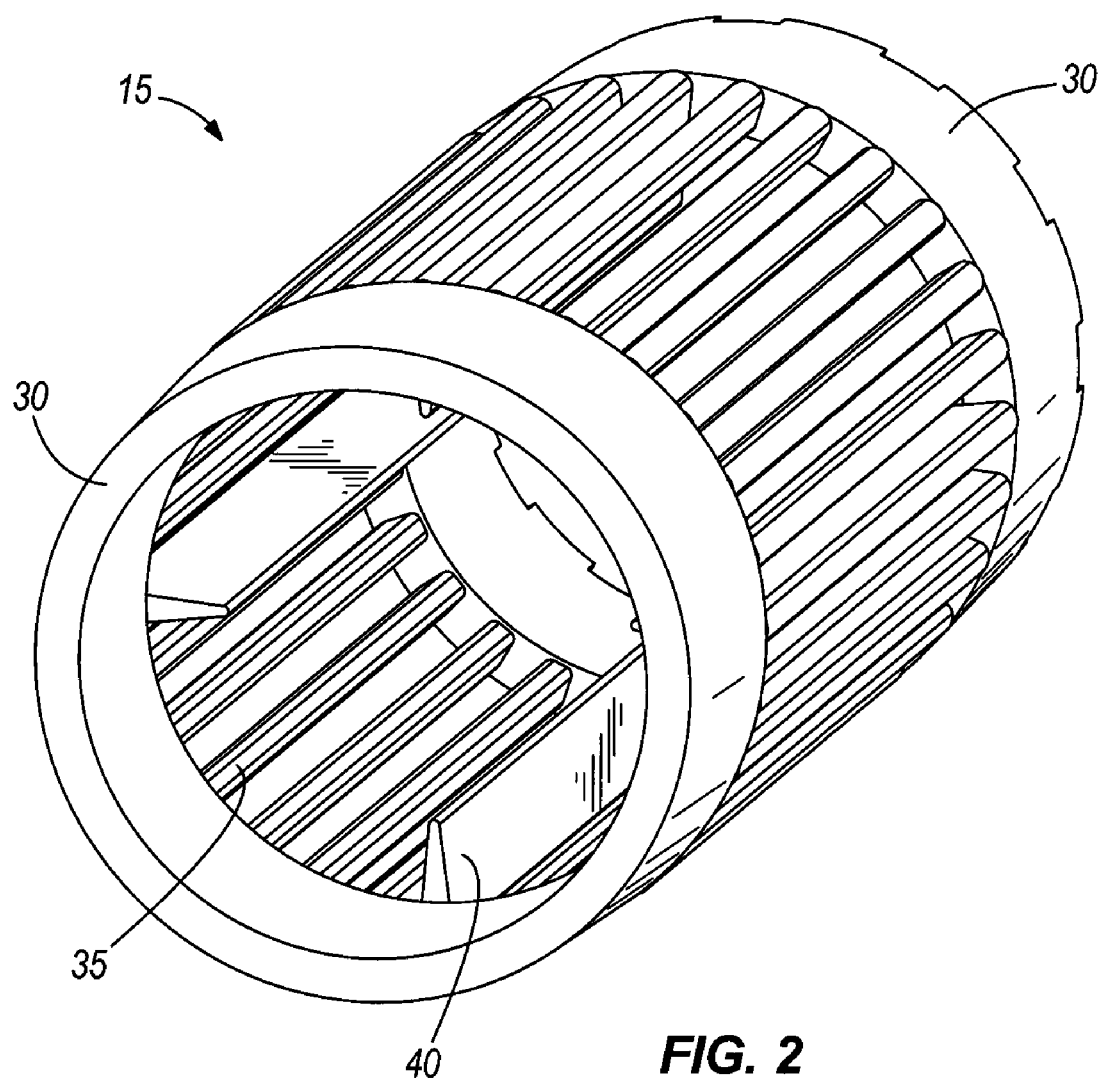
FIG. 2 is a perspective view of the rotor squirrel cage of the rotor of FIG. 1.

As illustrated in FIG. 2, the squirrel cage 15 includes a plurality of bars that extend between a pair of end-rings 30. The bars include several small bars 35 with four large bars 40 (or deep bars) arranged substantially symmetrically (i.e., at 90 degree intervals) around the squirrel cage 15. As will be discussed with regard to FIGS. 3 and 4, the quantity, shape, arrangement, and types of bars are dependent on the arrangement of the particular laminations 20 of the rotor body 10. As such, the invention should not be limited to the squirrel cage 15 illustrated in FIG. 1. Rather, it is illustrated as one possible example of the squirrel cage 15. In preferred constructions, the squirrel cage 15 is made of aluminum, which is die-cast into the plurality of laminations 20 to form a substantially unitary body. However, other constructions may employ other materials or other processes, (e.g. copper bars brazed to copper end rings) to form the squirrel cage 15.

Figure 3:
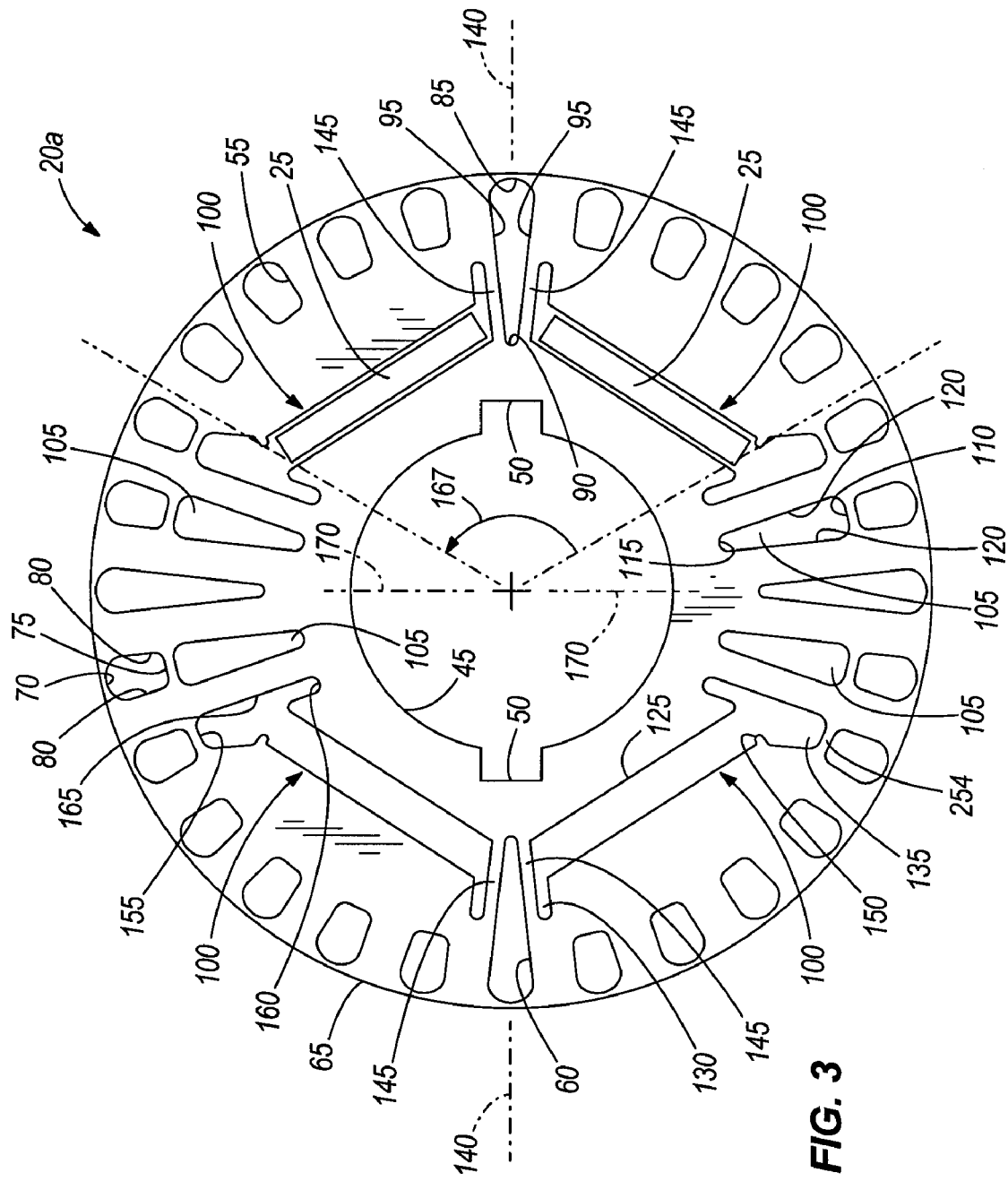
FIG. 3 is a front view of a lamination of the rotor of FIG. 1, also schematically showing two magnets.
Figure 4:
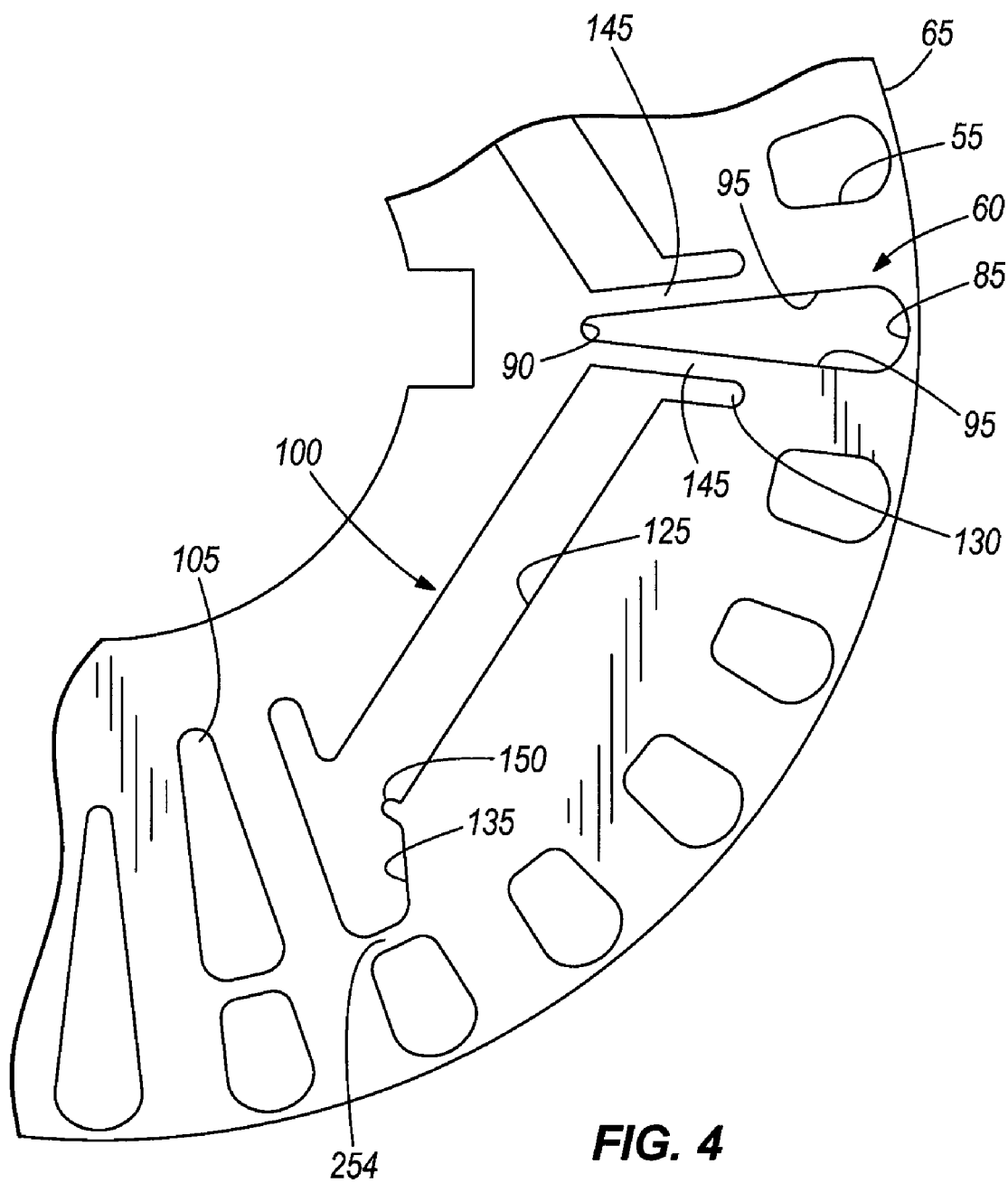
FIG. 4 is an enlarged front view of a portion of the lamination of FIG. 3.

FIGS. 3 and 4 illustrate one lamination 20a suitable for use in the rotor body 10 of FIG. 1. In preferred constructions, the laminations 20a are formed from electrical grade steel with other materials also being suitable for use. A central aperture 45 is formed in the lamination 20a to receive a shaft to complete the rotor. In the illustrated construction, the central aperture 45 includes one or more key ways 50 to receive a key that couples the lamination 20a and the shaft for rotation. The keyways are optional and therefore may be absent from some constructions.

The lamination 20a includes a plurality of small bar slots 55 (sometimes referred to as bar apertures, or rotor slots) and four deep bar slots 60 (sometimes referred to as bar apertures, or rotor slots) positioned near an outermost surface 65 of the lamination 20a. Each of the small bar slots 55 includes a rounded end 70 adjacent the outermost surface 65 and a substantially straight or planar end 75 opposite the rounded end 70. Two substantially radial sides 80 interconnect the rounded end 70 and the straight end 75. Because the two sides 80 are radial, they are not parallel to one another. However, other constructions could employ parallel sides, or non-parallel non-radial sides if desired. In addition, other shapes or arrangements of the rounded end 70 and the substantially straight end 75 could be employed if desired.

The four deep bar slots 60 are radially spaced about 90 degrees from one another. Each deep bar slot 60 includes a large arcuate end 85 adjacent the outermost surface 65 of the lamination 20a and a small arcuate end 90 opposite the large arcuate end 85. Two substantially straight side surfaces 95 interconnect the large arcuate end 85 and the small arcuate end 90 to complete the deep bar slots 60. In the illustrated construction, the arcuate ends 85, 90 are semi-circular with other shapes or arrangements also being suitable.

In the construction of FIG. 3, the small bar slots 55 and the deep bar slots 60 are substantially equally angularly spaced with six small bar slots 55 disposed between any two deep bar slots 60. Thus, in the construction of FIG. 3, the bar slots 55, 60 are separated by about 12.8 degrees. Of course a different number of bar slots 55, 60 or a different arrangement could be employed if desired.

Each lamination also includes four magnet apertures 100 and four elongated apertures 105. The elongated apertures 105 include a substantially flat end 110 positioned adjacent one of the small bar slots 55 and an arcuate end 115 opposite the flat end 110. Non-parallel straight sides 120 interconnect the flat end 110 and the arcuate end 115. As with the bar slots 55, 60, other arrangements and shapes could be employed to define the elongated apertures 105.

The elongated apertures 105 are arranged in pairs such that one of the pair is positioned on the clockwise side of one of the deep bar slots 60 and the other is positioned on the counter-clockwise side of the deep bar slot 60. In the illustrated construction, the elongated apertures 105 are positioned adjacent the 12 o-clock and the 6 o-clock deep bar slots 60.

Each magnet aperture 100 includes an elongated portion 125 (magnet-receiving portion), a bar portion 130 (first portion), and an extension portion 135 (second portion). The elongated portion 125 is substantially rectangular and is sized to receive the permanent magnet 25 or permanent magnet material. FIG. 3 illustrates magnets 25 in two of the elongated portions 125 but it should be understood that in the preferred construction each elongated portion 125 would include a magnet 25. Additionally, the magnets 25 are illustrated as being smaller than the elongated portion 125. However, as one of ordinary skill will realize, the magnets 25 or permanent magnet material will substantially fill the elongated portion 125. Thus, the magnets 25 are shown smaller for illustrative purposes only.

The bar portion 130 is positioned at one end of the elongated portion 125 and extends radially outward adjacent one of the deep bar slots 60. The angle of the bar portion 130 with respect to the elongated portion 125 inhibits movement of the magnet 25 toward the bar portion 130. In a 2-pole rotor construction, the north pole of each magnet 25 illustrated in FIG. 3 (i.e., the magnets adjacent the deep bar slot 60 at the 3 o'clock position) faces the rotor outermost surface 65 so that the deep bar 40 aligns with a center pole axis 140 of the rotor north pole.

The bar portion 130 cooperates with the adjacent deep bar slot 60 to define a long thin bridge 145. With four magnet apertures 100, four such bridges 145 are defined. The bridges 145 are designed to enhance the mechanical strength of the rotor and the performance of the rotor magnetic flux. During motor steady-state operation at synchronous speed, the magnetic saturation of the bridges 145 reduces the magnet leakage flux and therefore increases the motor output torque and/or efficiency. At reduced speed, during the motor start-up, the rotor teeth 161 (shown in FIG. 3) are saturated by the zigzag air-gap field and the bridges 145 provide an alternate path for the magnet flux so that the amount of PM flux linking the stator is reduced and consequently the detrimental magnet braking torque is also reduced. A rotor tooth 161 is defined, as is known to those skilled in the art, as a part of the rotor body radially delimitated by two consecutive rotor bar slots 55, 60.

The extension portion 135 defines a magnet stopping feature 150 that inhibits movement of the magnet 25 toward the extension portion 135. Thus, the magnet 25 is firmly held in the desired position by the bar portion 130 and the magnet stopping feature 150.

The extension portion 135 includes a flat end 155 disposed adjacent one of the small bar slots 55 and an arcuate end 160 opposite the flat end 155. An edge 165 extends from the flat end 155 to the arcuate end 160 to enclose one side of the extension portion 135.

The extension portion 135 cooperates with the small bar slot 55 which is substantially placed at the same angular coordinate, create a profile similar to that created by the elongated aperture 105 and the adjacent small bar slot 55 that are positioned adjacent the extension portion 135.

The deep bar 40 at the 6 o'clock position is aligned with an inter-polar axis 170 that separates the south and north rotor poles. This design makes it possible to use two rectangular magnets 25 and yet achieve an equivalent PM arc 167 of 120 to 165 electrical degrees, which optimizes the quantity of magnet 25 in a motor having the stator built with substantially sinusoidally distributed windings. It should be noted that the arc 167 is shown as extending from the extreme ends of the magnets 25. However, the actual arc 167 is related to the distribution of the magnetic flux in the air gap. As such, the illustrated angle is approximate.

The combination of the extension portion 135, the elongated aperture 105, and the two adjacent small bar slots 55, the rotor teeth and magnetic bridges around the inter-pole deep bar 40 at the 6 o'clock position allows the magnet flux to gradually decrease in the neighboring area of the stator to rotor air-gap and increase the equivalent magnetic pole coverage area enhancing motor performance. Additionally, the configuration is beneficial for the start-up performance though an electromagnetic phenomenon similar to that previously described with reference to the bridges 145.

Permanent magnets (PM) 25, made of NdFeB or ferrite, are attached (inserted) into the rotor body 10. Rectangular blocks of PM are preferable to arc segments from a cost and manufacturability point of view. Of course other constructions may employ other magnetic material other shapes or the magnets, and/or multiple magnets within one magnet aperture 100 as may be desired.

As discussed, the construction shown in FIGS. 1-4 includes two types of rotor cage bars, large 40 and small 35. In the preferred construction, the area of the center-pole bars 40 (3 o'clock and 9 o'clock) is equal to the area of the inter-pole bars 40 (12 o'clock and 6 o'clock) and the cage 15 is electrically virtually non-salient with the D and Q axis rotor resistances being substantially equal, thereby improving the motor starting capability. In an alternative construction, the cage 15 is made only of small bars 35 and the deep bars 40 are each replaced by a combination of a small bar 35 and a flux barrier underneath it (see FIG. 7), similar to the combination of the elongated aperture 105 and the adjacent small bar slot 55. In the preferred construction the magnet apertures 100 only contain permanent magnets 25 or permanent magnet material and air. No aluminum from the die-cast cage 15 is in direct contact with the magnet 25, thereby enhancing the manufacturability of the rotor body 10.

Figure 5:
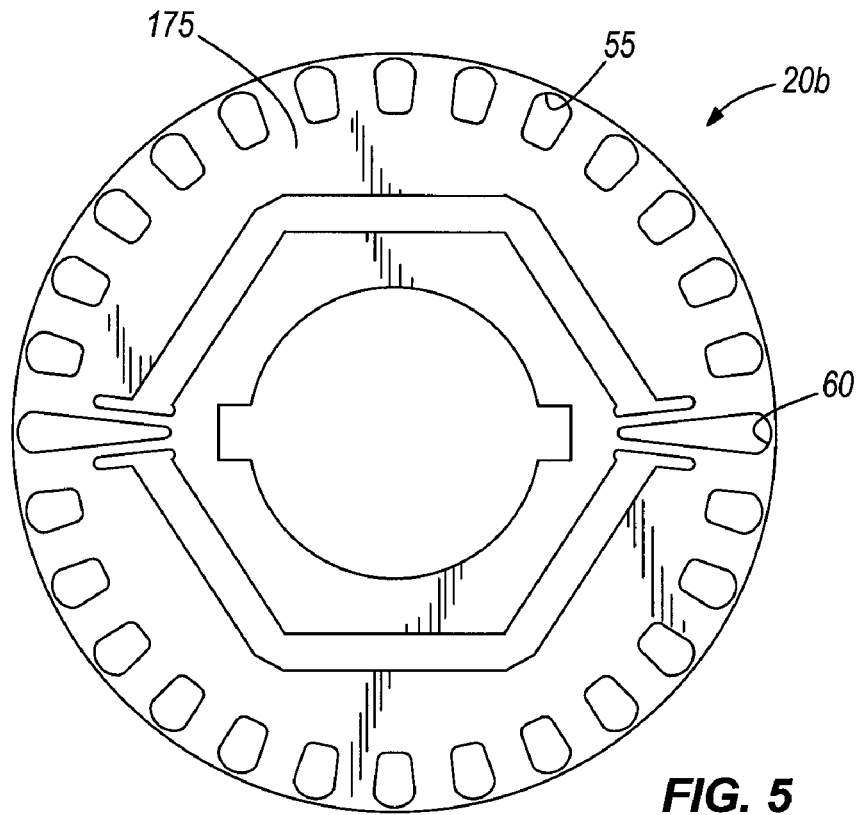
FIG. 5 is a front view of another lamination suitable for use in the rotor of a line-start permanent magnet synchronous motor embodying the invention.
Figure 6:
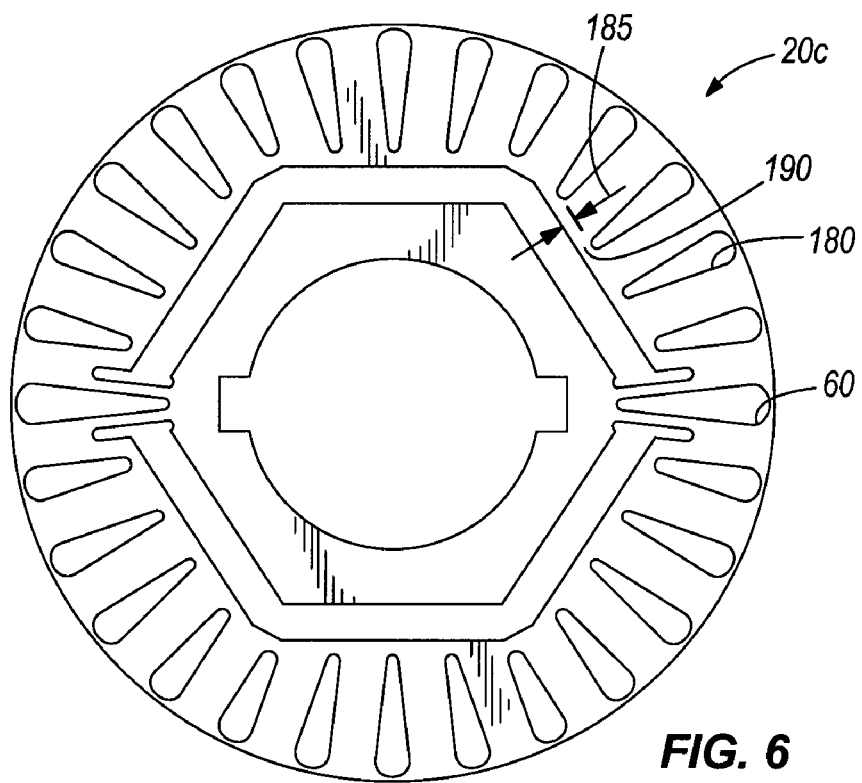
FIG. 6 is a front view of yet another lamination suitable for use in the rotor of a line-start permanent magnet synchronous motor embodying the invention.

FIGS. 5 and 6 illustrate other constructions of laminations 20b, 20c suitable for use in the rotor body 10 of FIG. 1. In both of the constructions of FIGS. 5 and 6 the magnet 25 is separated from the aluminum cage by portions of the rotor laminations 175. The construction in FIG. 6 has rotor slots 180 that contain bars of different depth so that the distance 185 between the magnet 25 and the lower part of each slot 180 is substantially constant and relatively small thereby, leaving small magnetically saturatable bridges 190 between the slots 180 and the magnets 25. In this design, the rotor slots 180 operate also as flux barriers and the magnetic structure is salient with the d-axis inductance being substantially lower than the q-axis inductance resulting in an additional reluctance torque component and increased motor output.

Figure 7:
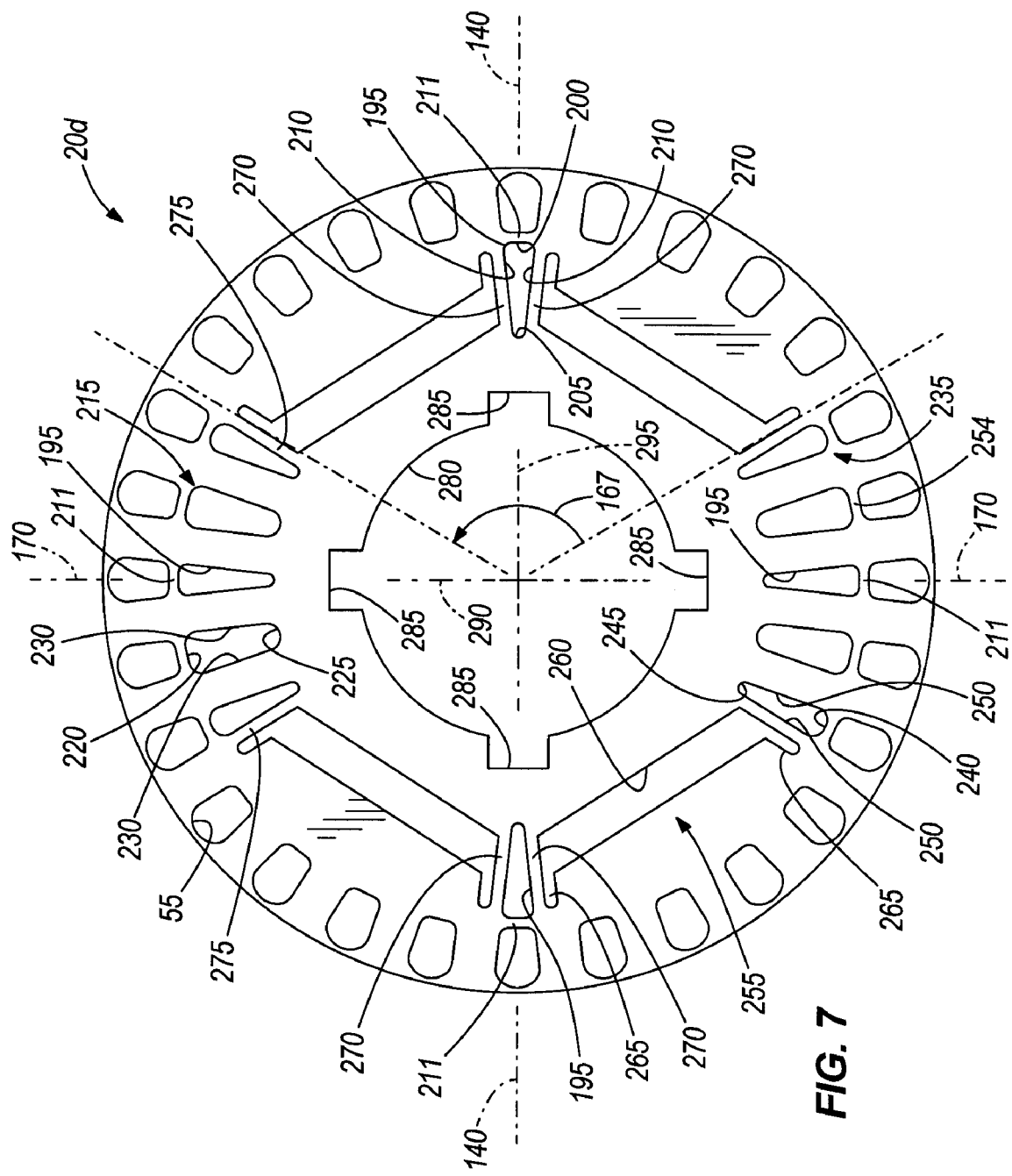
FIG. 7 is a front view of another lamination suitable for use in the rotor of a line-start permanent magnet synchronous motor embodying the invention.
Figure 8:
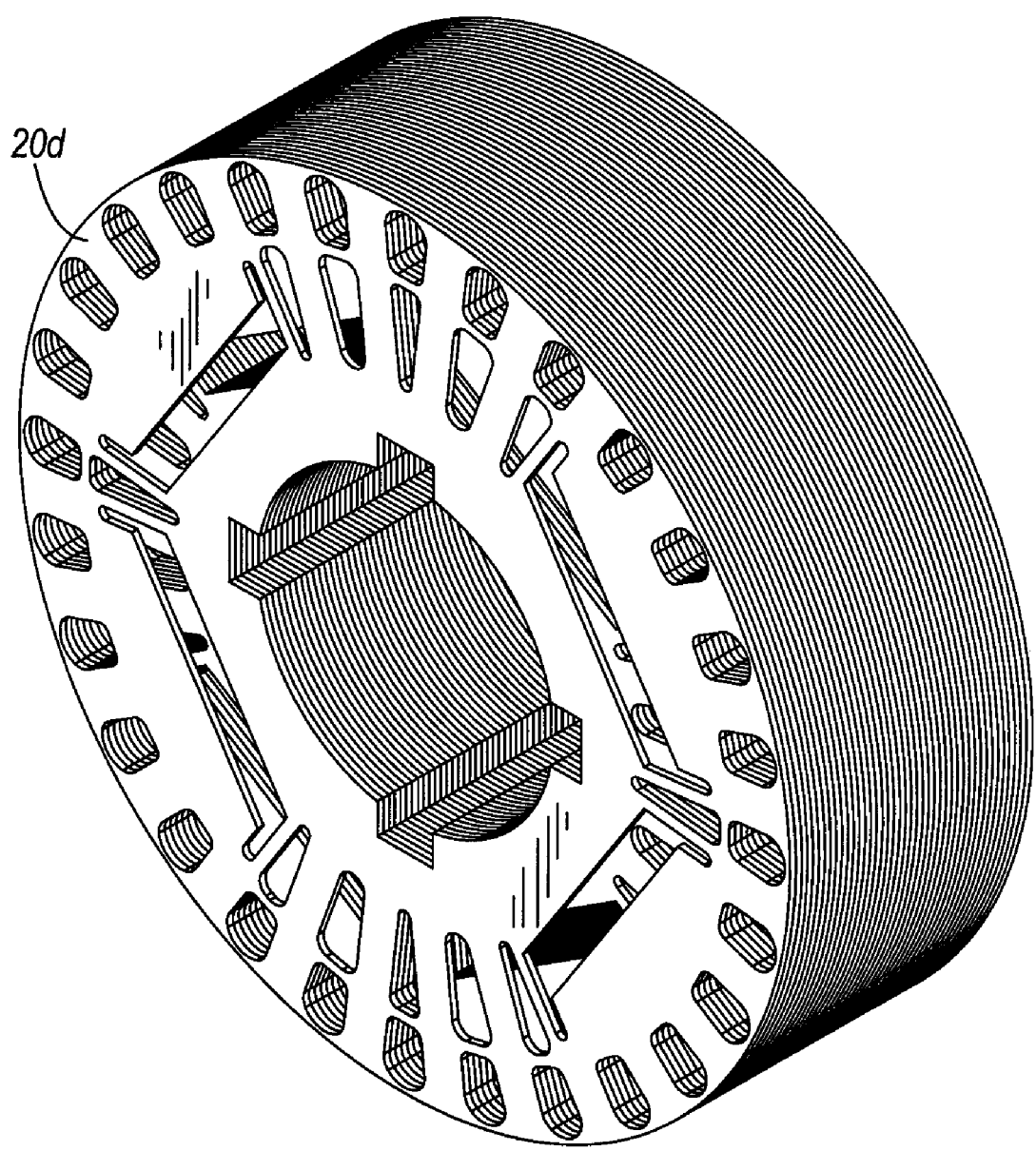
FIG. 8 is a perspective view of a portion of a rotor body employing the laminations of FIG. 7.

FIG. 7 illustrates another lamination 20d that is suitable for use in the rotor body 10 of FIG. 8. The lamination 20d includes twenty-eight small bar slots 55 that are substantially equally spaced around the outer circumference of the lamination 20d and are all at substantially the same radial depth. Each of the small bar slots 55 is substantially the same as the small bar slots 55 described with regard to FIGS. 3 and 4. As should be understood, a different quantity, shape, or arrangement of slots could be employed if desired.

The lamination 20d of FIG. 7 includes four deep slots 195 positioned immediately inward of the small bar slots 55 at the 12 o'clock, the 3 o'clock, the 6 o'clock, and the 9 o'clock positions. Each of the deep slots 195 includes a substantially straight end 200 positioned adjacent the small bar slot 55 and an arcuate end 205 opposite the straight end 200. Two side surfaces 210 connect the straight end 200 and the arcuate end 205 to complete a substantial wedge shape. Each of the deep slots 195 cooperates with the adjacent small bar slot 55 to define a thin bridge 211 that can magnetically saturate.

In one construction, the rotor cage 15 is die-cast only in the small bar slots 55, while the deep slots 195 are not filled with aluminum and operate as flux barriers. The inter-polar bridges 211 (12 o'clock and 6 o'clock) enhance the motor starting capability by providing an alternative path for the magnet leakage flux during the start-up process. The substantially straight surfaces 155, 200, 220 cooperate with the straight end 75 of the adjacent bar slots 55 to define thin bridges 211, 254 having a substantially uniform width.

Four additional elongated slots are formed near the 12 o'clock position and the 6 o'clock position of the lamination 20d of FIG. 7. The first two elongated slots are wide slots 215 that are positioned on opposite sides of the deep slot 195. Each wide slot 215 includes a substantially straight end 220 adjacent one of the small bar slots 55 and an arcuate end 225 opposite the straight end 220. Two straight edges 230 interconnect the straight end 220 and the arcuate end 225. The width of the wide slot 215 is greater than the width of the deep slots 195. The wide slots 215 and the adjacent small bar slots 55 cooperate to function in much the same way as the elongated apertures 105 and the adjacent small bar slots 55 of the lamination 20a of FIGS. 3 and 4.

Adjacent each of the wide slots 215 is a narrow slot 235. Each narrow slot 235 includes a substantially arcuate first end 240 positioned adjacent one of the small bar slots 55 and a second arcuate end 245 opposite the first arcuate end 240. Two straight side surfaces 250 interconnect the first arcuate end 240 and the second arcuate end 245. The narrow slots 235 have a width that is less than that of the wide slots 215 but that is similar to the width of the deep slots 195. From a magnetic point of view, the narrow slots 235 function in much the same way as the extension portion 135 of the magnet apertures 100 of the lamination 20a of FIGS. 3 and 4.

Four magnet apertures 255 are formed in each lamination 20d to support magnets 25 or magnetic material much like that employed in the construction described with regard to FIGS. 3 and 4. Each magnet aperture 255 includes a substantially rectangular magnet portion 260 and two bar portions 265 that are approximately radially oriented. The magnet portions 260 are sized to receive and retain the desired magnets 25 or magnetic material. Each bar portion 265 is similar to the bar portion 130 described with regard to FIGS. 3 and 4. The angle of the bar portions 265 with respect to the magnet portion 260 is such that the bar portions 265 inhibit unwanted movement of the magnets 25 within the magnet portions 260.

The bar portions 265 adjacent the deep slots 195 at 3 o'clock and 9 o'clock cooperate with the deep slots 195 to define a substantially thin and substantially radially oriented bridge 270 that electromagnetically functions much like the thin bridge 145 described with regard to FIGS. 3 and 4. Similarly, the opposite bar portions 265 cooperate with the adjacent narrow slot 235 to define substantially radially oriented bridge portions 275 therebetween. The substantially constant width of the bridges 270, 275 is dimensioned to magnetically optimize both the steady-state synchronous motor operation and the asynchronous starting operation. The substantially radial orientation of the bridges 270, 275 enhances the mechanical strength of the rotor body 10.

The lamination 20d of FIG. 7 also includes a central bore 280 sized to receive a rotor shaft. In the illustrated construction four key ways 285 are formed in the central bore 280 and are sized to receive a key that couples the lamination 20d and the rotor shaft for rotation. In other constructions there are no keyways and other means (e.g. an interference fit) are employed to couple the rotor body to the shaft. The construction illustrated in FIG. 7 is symmetrical about both a vertical axis 290 that passes through the center of the central bore 280 and a horizontal axis 295 that passes through the same center. However, the lamination 20d does not include four symmetrical 90 degree segments. As such, a second lamination 20d, rotated 90 degrees will not completely align with the illustrated lamination 20d. However, the small bar slots 55 and the deep slots 195 will align. In other words, in the preferred construction, the small bar slots 55 and the deep slots 195 are of the same size and have substantially the same radial placement, respectively. Therefore, for example, if the lamination of FIG. 7 is rotated by exactly 90 degrees in a counter clockwise direction, the small bar slots 55 and the deep slots 195 will occupy the position previously occupied by similar small bar slots 55 and deep slots 195, respectively. This design feature is conveniently employed in the manufacturing process, as later described.

Figure 9:
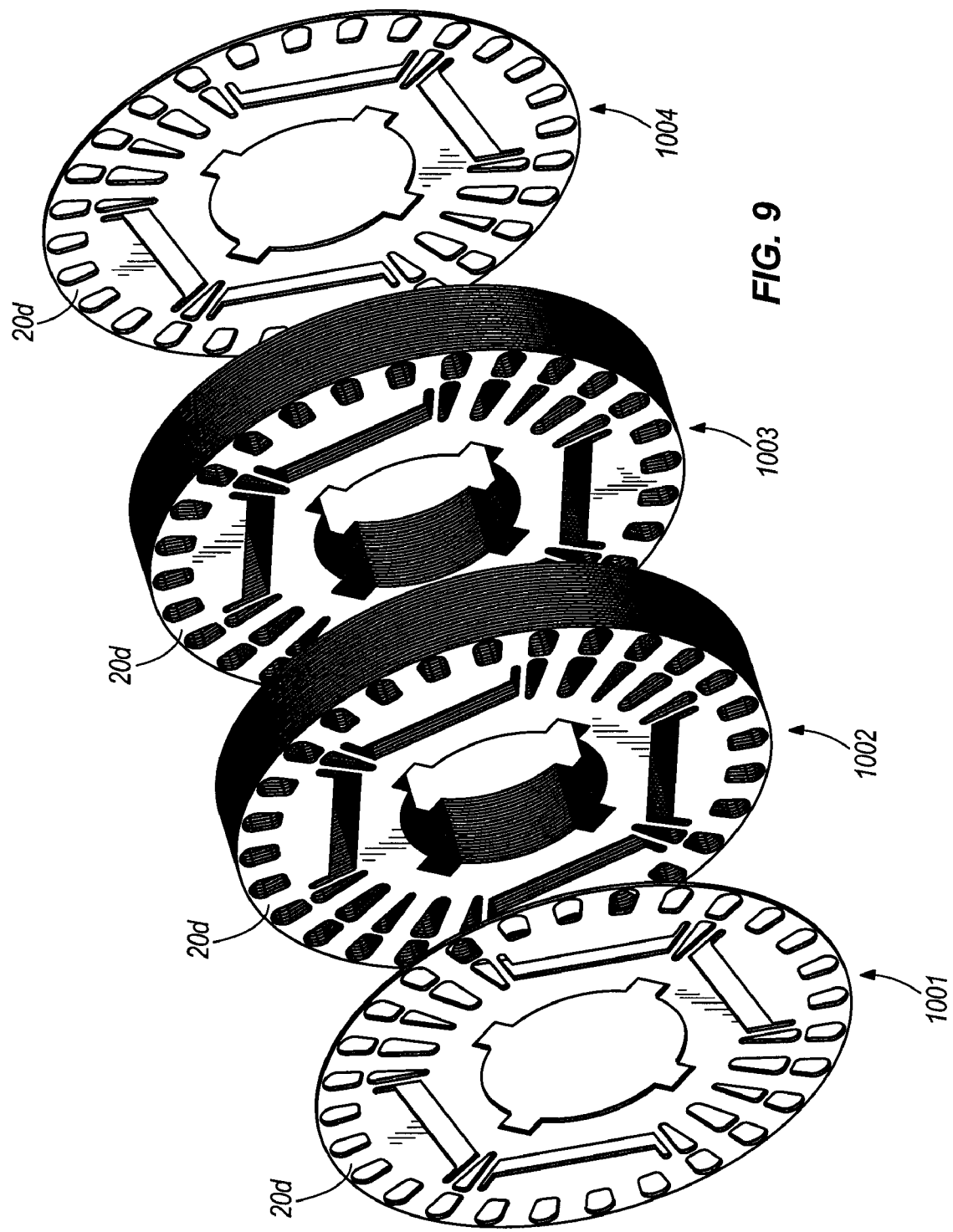
FIG. 9 is an exploded perspective view of the portion of the rotor body of FIG. 8.
Figure 10:
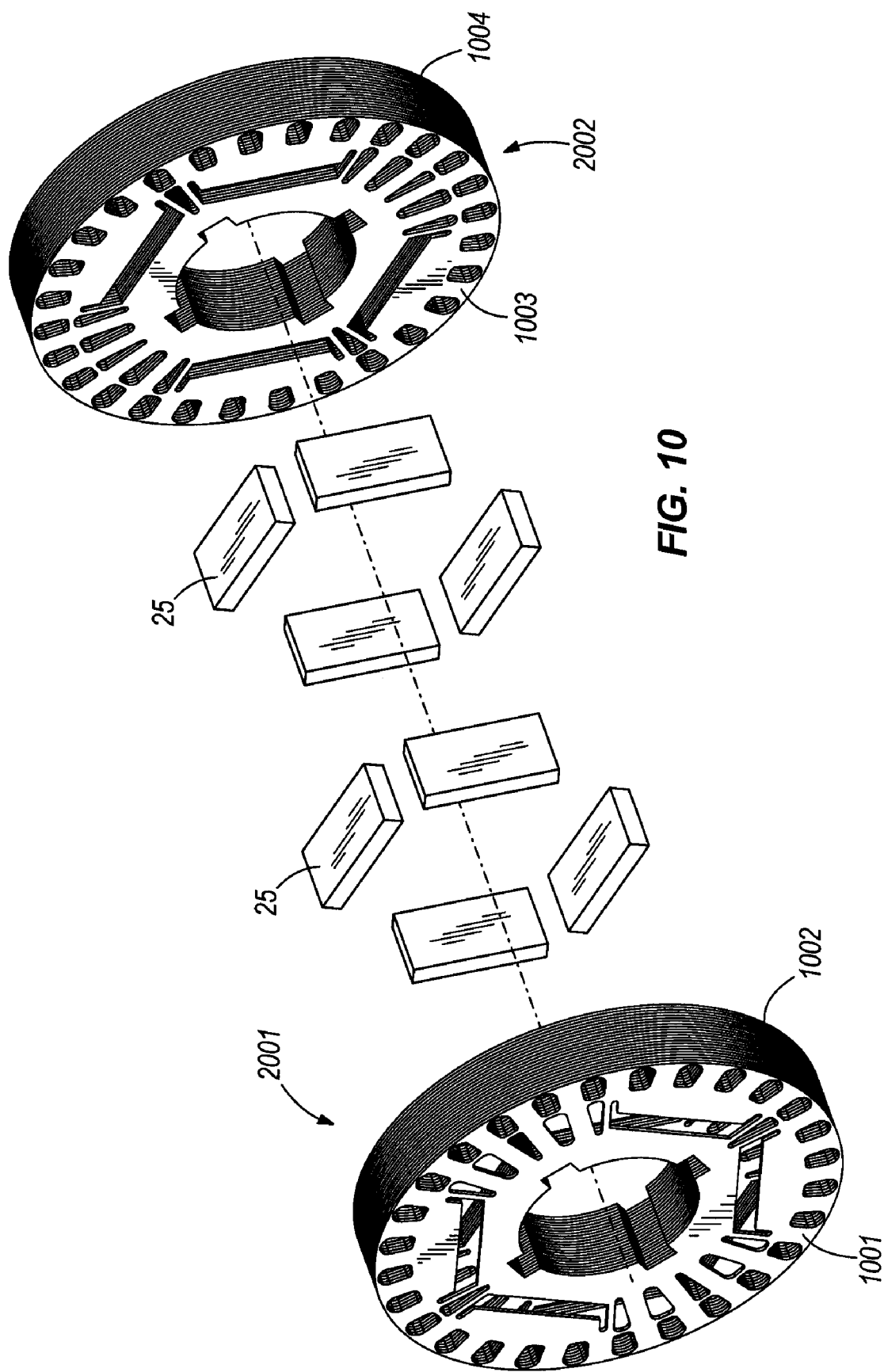
FIG. 10 is an exploded perspective view of the portion of the rotor body of FIG. 8 also showing magnets.

FIG. 8 illustrates a portion of the rotor body similar to the rotor body 10 of FIG. 1 before the bar cage 15 is formed and employing the laminations 20d of FIG. 7. As can be seen, the central bore 280, the small bar slots 55, and the deep slots 195 are all aligned, while the remaining apertures of the last lamination are not aligned with their corresponding apertures of the remaining laminations. As illustrated in FIG. 9, this is achieved by first stacking a plurality of laminations 20d such that all of the apertures are aligned. The permanent magnets 25 are then inserted into the stack of laminations 20d as shown in FIG. 10. The final lamination 20d on each end is then rotated 90 degrees such that only the central aperture 280, the small bar slots 55, and the deep slots 195 are all aligned. This will allow for the casting of the bar cage 15 through all of the laminations 20d. The mis-alignment of the magnet apertures 255 allows the end laminations 20d to function as a stop that inhibits undesirable axial movement of the magnets 25 within the magnet apertures 255.

FIG. 9 illustrates four axial groups of laminations 1001-1004. The first group 1001 has a very small number of laminations 20d or even only one lamination 20d. The second group 1002 has substantially half of the number of laminations 20d from the finished rotor body 10. The laminations 20d from the second group 1002 are rotated by 90 degrees with respect to the laminations 20d from the first group 1001. The third group of laminations 1003 is aligned with the second group of laminations 1002, with which it has substantially the same axial length. It should be noted that the alignment of the 1002 and 1003 groups of laminations or their equal lengths are not absolute requirements. For example, in one construction the group 1003 is rotated with respect to group 1002 by approximately one rotor bar slot pitch, causing a staggered skew of the magnets while ensuring the continuity of the rotor cage bars. Finally, the last group of laminations 1004, is rotated 90 degrees with respect to the third group 1003, and has a very small number of laminations 20d or even only one lamination 20d.

The first group of laminations 1001 is attached to the second group 1002, for example by employing a multi-step progressive punching die with rotational and lamination-to-lamination interlocking features, and together they form the subassembly 2001 (see FIGS. 9-10). The third group of laminations 1003 is attached to the fourth group 1004 to form the subassembly 2002. Magnets 25 having substantially the same axial length as the core modules 1002 and 1003 are inserted into the laminated core as shown in FIG. 10 and the two subassemblies are joined together as shown in FIG. 8, with the magnets 25 being held axially captive by the end modules 1001 and 1002.

One advantage of the previously described procedure is that the magnets 25 do not need to be permanently glued, which is beneficial especially for motors used in hermetic compressors. Furthermore, the procedure only requires one type of lamination 20*d* and therefore reduces the tooling and inventory cost. Additionally, because of the lamination configuration, with the magnets 25 being grouped closer to the center-pole axis and the relative reduced magnet coverage of the pole-pitch, the magnet contact with the end modules 1001, 1002, is reduced and the magnet axial flux leakage diminished, increasing the motor output power and/or efficiency. As all the laminations 20*d* are punched in the same axial direction the effect of the burr is small and the mechanical tolerances of the stack improved.

Figure 11:
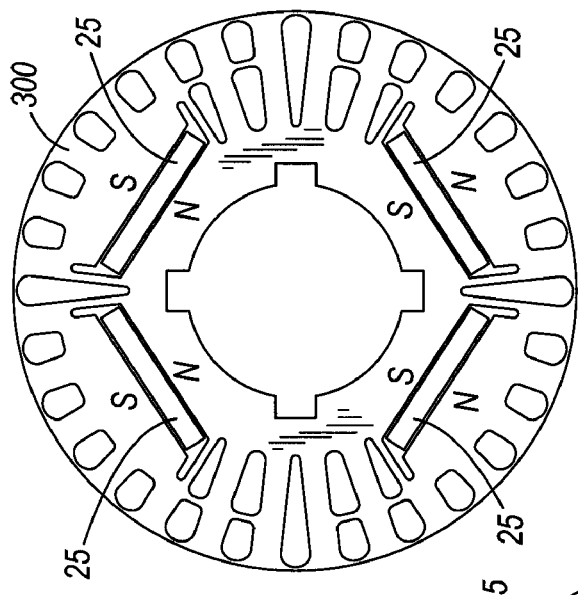
FIG. 11 is a front view of another rotor body illustrating a magnet arrangement for a 2-pole motor.
Figure 13:
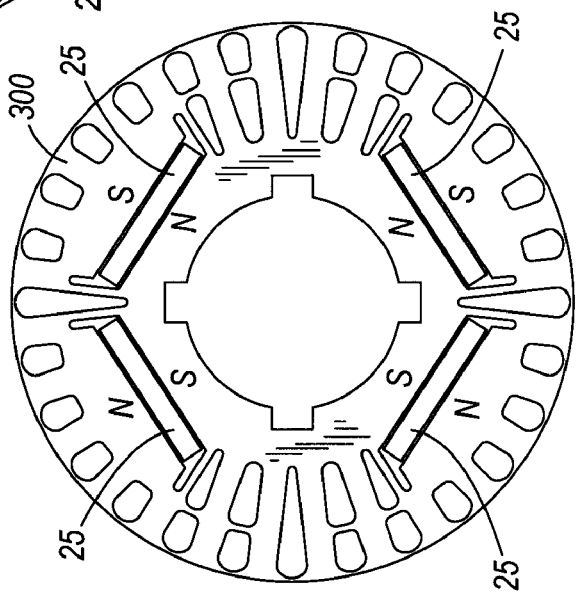
FIG. 13 is a front view of the rotor body of FIG. 11 illustrating another magnet arrangement.
Figure 12:
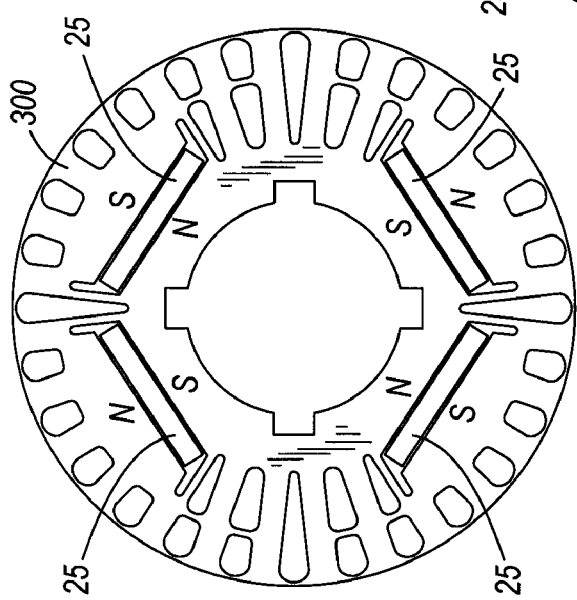
FIG. 12 is a front view of the rotor body of FIG. 11 illustrating a magnet arrangement for a 4-pole motor.

FIGS. 11-13 illustrate different arrangements for the polarity of the magnets in rotors employing a lamination 300 similar to those illustrated in FIGS. 1-10. It is understood that the features and the concepts previously described can be extended from a 2-pole configuration as shown in FIGS. 11 and 13 to designs with a higher number of poles such as the 4 pole arrangement of FIG. 12 without changing the design of the laminations. This can be achieved, for example, by employing different magnet arrangements such as the 4-pole example of FIG. 12 and/or by duplicating a 2-pole configuration on multiple groups of rotor pole pairs.

The arrangement shown in FIG. 11 is preferred for 2-pole motors. Grouping around the center-pole axis the magnets of the same polarity increases the magnetic field around the center-pole axis and reduces the field around the inter-polar axis. As a result, the sinusoidality of the rotor to stator air-gap magnetic field is improved and motor performance enhanced.

Figure 14:
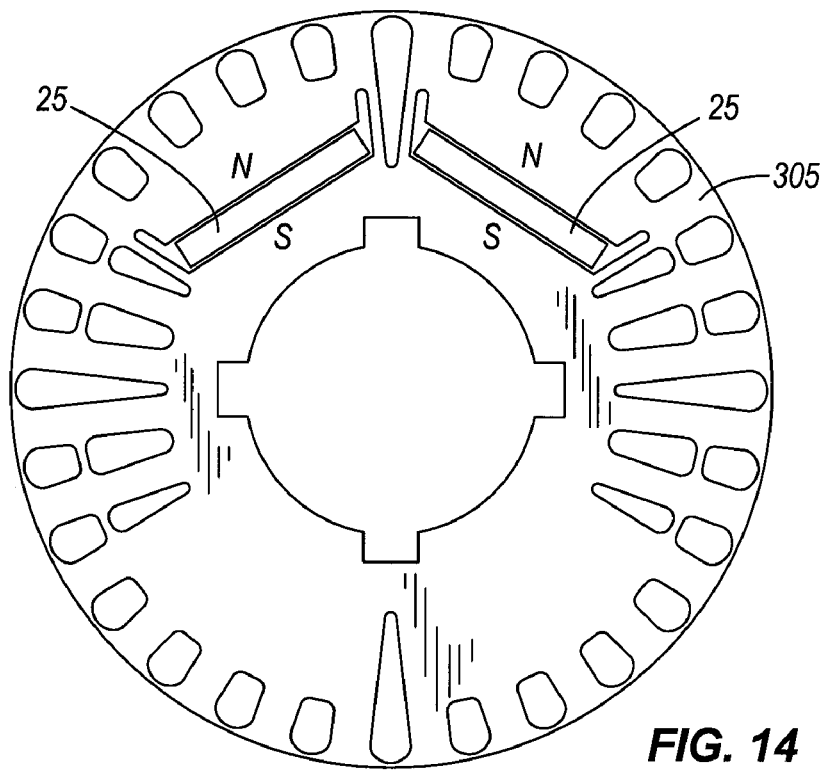
FIG. 14 is a front view of another rotor body illustrating a magnet arrangement for a 2-pole motor.
Figure 15:
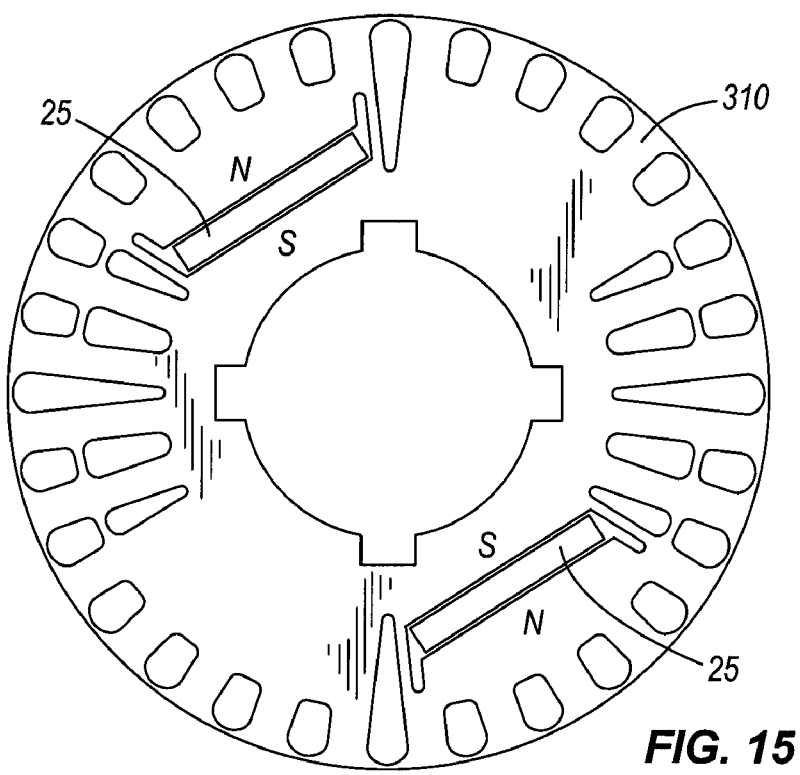
FIG. 15 is a front view of another rotor body illustrating a magnet arrangement for a 4-pole motor.

FIGS. 14 and 15 show a 2-pole rotor lamination 305 and a 4-pole rotor lamination 310, respectively, including consequent pole arrangements in which only half of the magnet slots used in the constructions of FIGS. 3 and 7 are employed. The combination of slots, flux barriers and bridges enhances the performance of a consequent pole motor employing rotor laminations 305, 310 and contributes to a reduction in the required quantity of permanent magnets 25 and as such, the cost of the motor. Consequent pole arrangements can also be obtained by employing laminations with four magnet slots, as shown in FIGS. 11-13 and filling two of the slots with soft magnetic material, such as blocks of mild steel thereby, resulting in arrangements that are magnetically equivalent with those of FIGS. 14-15.

Figure 18:
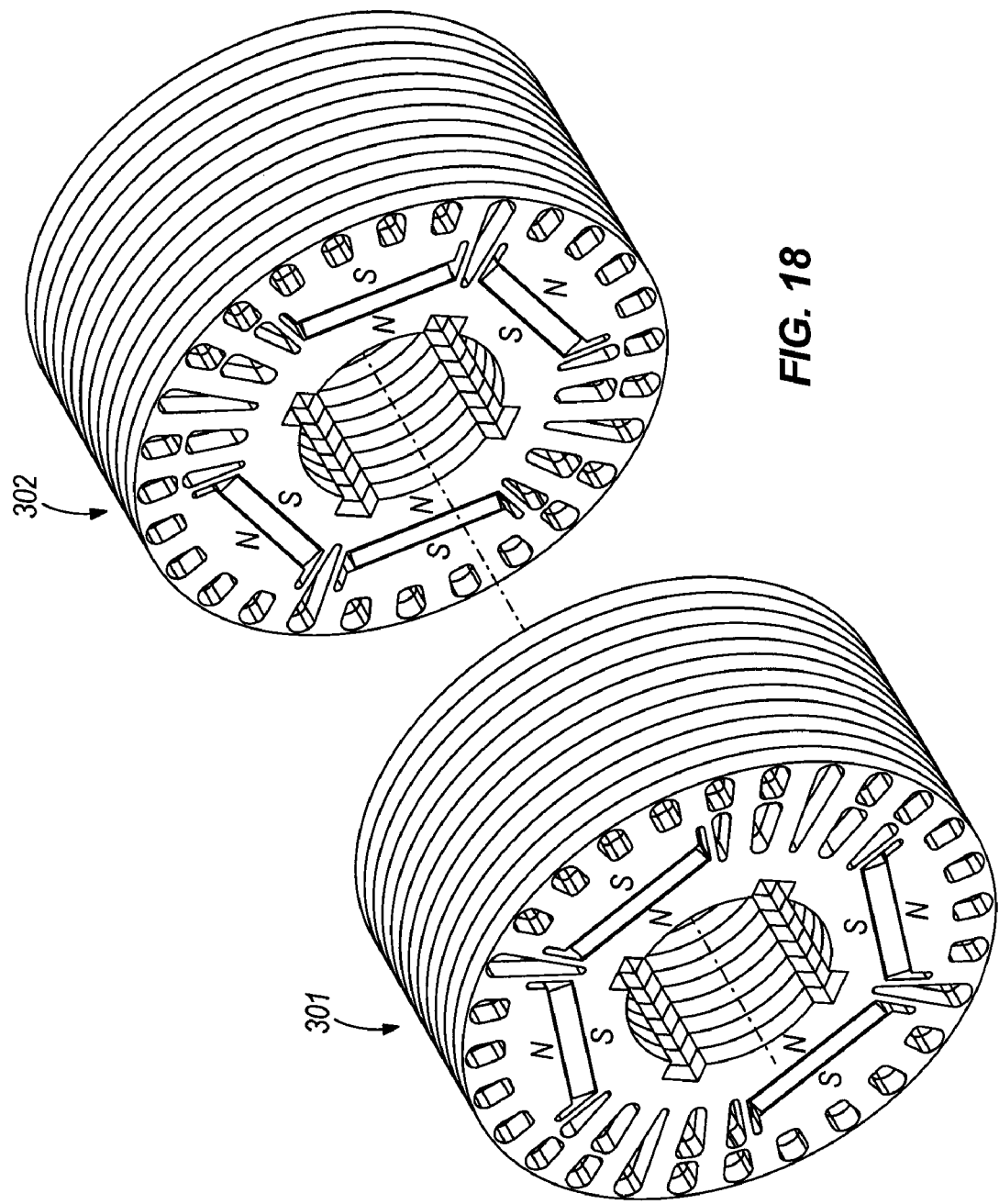
FIG. 18 is an exploded perspective view of a rotor body with two axial modules, one of which employs the lamination and the magnet arrangement shown in FIG. 12.
Figure 19:
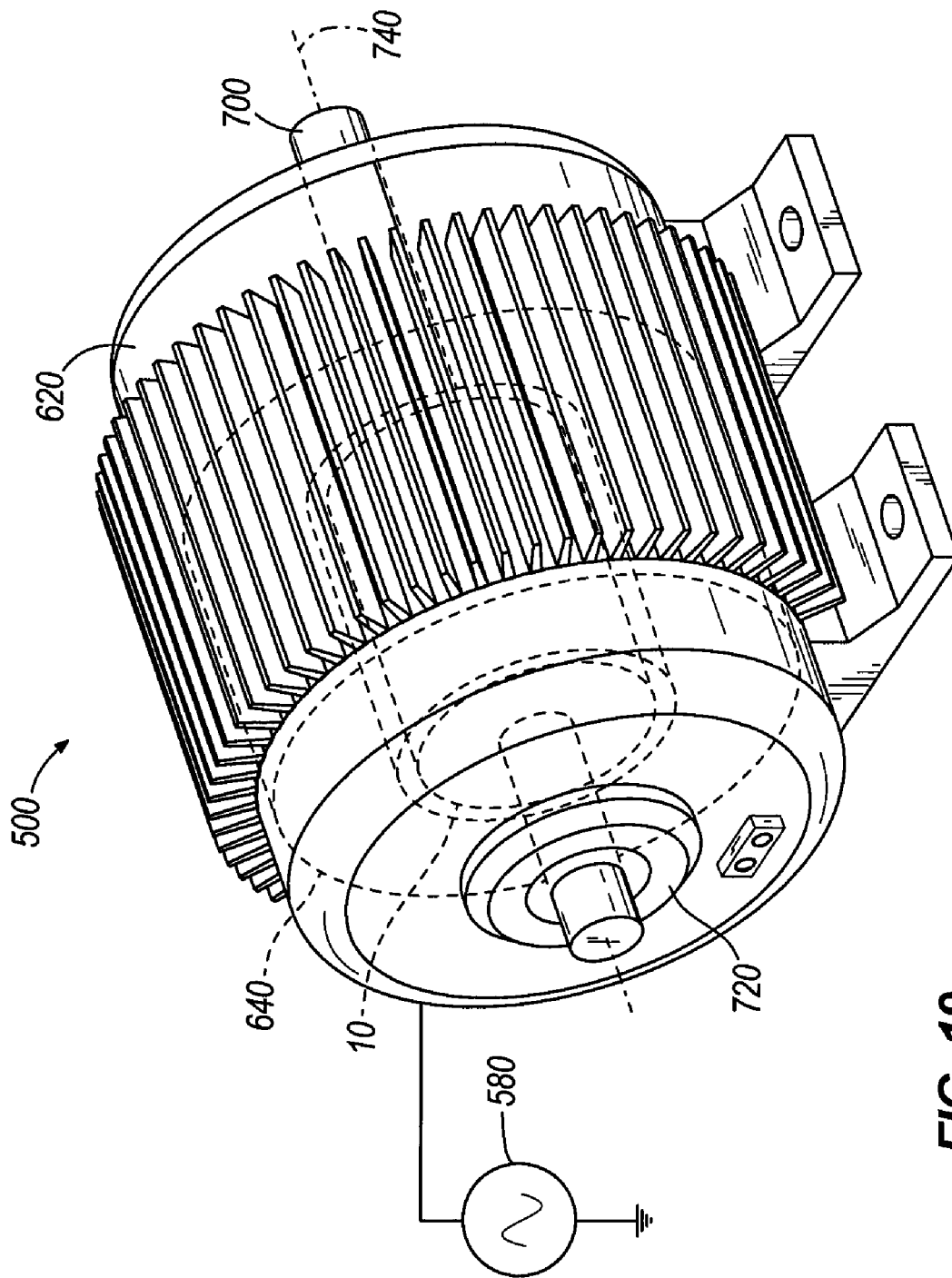
FIG. 19 is a perspective view of a motor including the rotor body of FIG. 1.

The rotor laminations shown for example in FIGS. 11-13 are symmetrical with respect to the inter-polar axis and are anti-symmetrical with respect to the center-pole axis. Additionally, rotor laminations with no symmetry with respect to the center-pole axis are also possible. In order to axially average-balance the contributions of the North and the South poles, respectively, for the 4-pole motor configuration employing the arrangement of FIG. 12, two axial modules 301, 302 of rotor core can be employed, as shown in FIG. 18. The first module 301 is arranged and positioned as shown in FIG. 12. The second core module 302 is built by rotating the laminations by 90 or 270 degrees. The magnets in the second core module 302 are positioned as to substantially align with the like polarity of the magnets from the first module 301.

It is also understood that the function of the aluminum die-cast rotor squirrel cage in providing an asynchronous starting torque can be achieved through other means known to those skilled in the art, such as with a short circuited rotor winding (commonly referred as a wound cage), through a reluctance, a "solid pole" effect etc.

Figure 16:
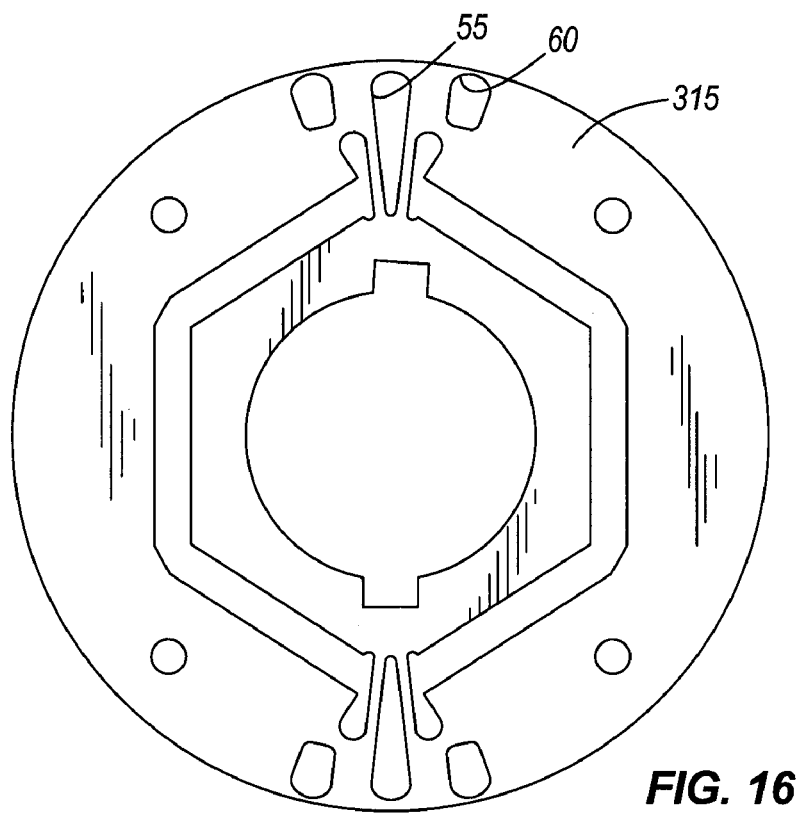
FIG. 16 is a front view of another rotor lamination.
Figure 17:
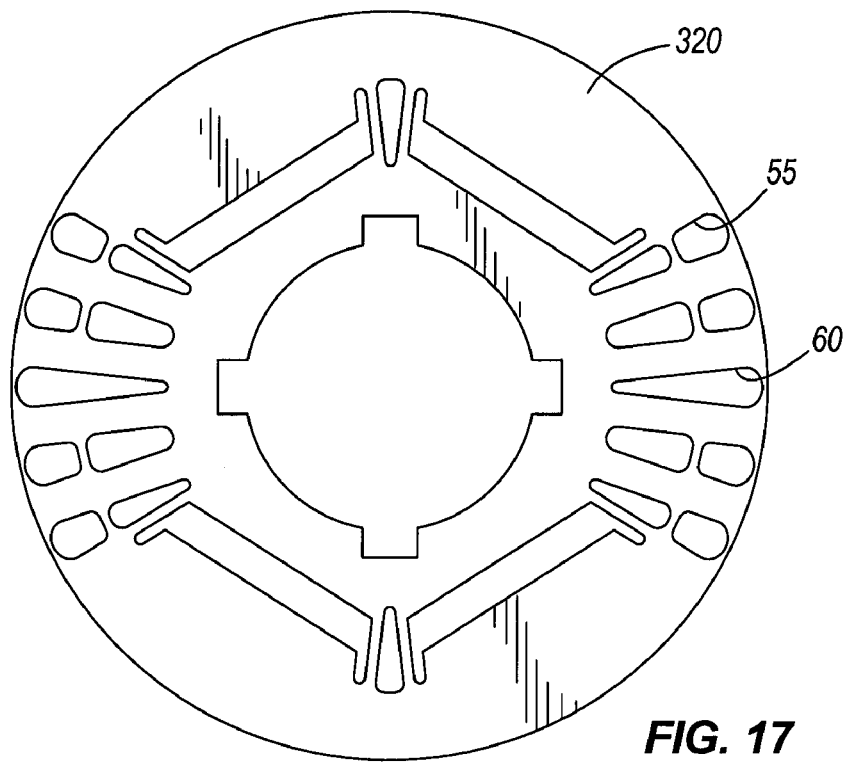
FIG. 17 is a front view of another rotor lamination.

Some of the magnet and flux barriers arrangement features previously described can be employed in laminations 315, 320 used in motors that do not have a rotor squirrel cage, such as electronically controlled motors (see FIGS. 16-17). In this case, most of the rotor slots for the small bars of the cage are not present, such that the magnetic permeance of the q-axis flux path of the armature reaction is increased and the rotor saliency contributes to additional reluctance torque. Some of the small bar slots 55 for the small bars of the cage 15, especially those from the inter-polar regions, are still present so that in cooperation with flux barriers define substantially thin rotor bridges that minimize the magnet leakage flux.

FIGS. 16 and 17 show examples of laminations 315, 320 for electronically controlled motors that can be produced with minimal modifications from the tooling used for the laminations shown in FIGS. 5 and 7, respectively. The same magnetizing equipment can be employed to produce the core for a line-fed/start motor and for its electronically controlled counterpart. This approach is beneficial in minimizing the investment required for tooling.

The constructions of FIGS. 16 and 17 include bar apertures 55, 60 that are similar to those of the construction illustrated in FIG. 3. However, the bar apertures 55, 60 do not include bars. Rather, the bar apertures 55, 60 contain no magnetic or electrically-conductive material and act as flux barriers. The constructions illustrated in FIGS. 3-15 could also employ bar apertures that do not include bars 35. For example, the construction of FIG. 3 could employ an arrangement in which every other bar aperture 55 includes a bar 35 with the remaining bar apertures 35 containing no magnetic or electrically-conductive material.

Many of the constructions herein illustrate two-pole rotors. In these rotors, the inter-polar axis 170 and the center pole axis 140 are mechanically normal to one another. In other rotor constructions in which the polarity is greater than two (e.g., eight-pole rotors, sixteen-pole rotors, etc.), the inter-polar axis 170 and the center pole axis 140 are not mechanically normal to one another. However, the inter-polar axis 170 and the center pole axis 140 are always oriented at 90 electrical degrees with respect to one another. As is known by those of ordinary skill, the mechanical degrees are equal to the electrical degrees divided by the number of pole pairs. Thus, in four pole constructions, their are two pole pairs and the inter-polar axis 170 and the center pole axis 140 are mechanically separated by forty-five degrees but electrically are ninety (mechanical) degrees apart.

It should also be noted that the inter-polar axis 170 and the center pole axis 140 extend radially outward from the center of the lamination or rotor. Thus, in a two-pole rotor, there are two inter-polar axes 170 that are parallel to one another and extend in opposite directions. Similarly, there are two center pole axes 140 that are parallel to one another and extend in opposite directions. In higher polarity motors, the inter-polar axes 170 may not be parallel to one another from a mechanical (geometrical) point of view. However, any two adjacent inter-polar axes 170 define the ends of a pole.

While the rotors illustrated herein are arranged to be positioned within a stator. One of ordinary skill in the art will appreciate that the invention could be applied to motors that include rotors positioned outside of the stator. These so called inside-out motors are well-suited for use with the present invention.

It should be noted that any feature described with respect to one particular arrangement could be applied to any other lamination described herein as well as to other lamination designs. As such, none of the features described herein should be limited to the particular lamination with which they are described.

Thus, the invention provides, among other things, a new and useful rotor body 10 for a permanent magnet motor. More particularly, the invention provides a new and useful internal permanent magnet rotor body 10 for a permanent magnet motor.

What is claimed is:

1. An electric machine comprising:
   a stator;
   a rotor core positioned adjacent the stator and rotatable about a longitudinal axis, the rotor core including a plurality of bar apertures, a plurality of elongated flux barriers separate from the bar apertures and positioned completely radially inward of at least one of the bar apertures, and a plurality of magnet slots separate from the bar apertures and positioned radially inward of a portion of the bar apertures;
   a plurality of magnets, each positioned in one of the magnet slots;
   a plurality of conductive bars each positioned in one of the bar apertures and including a first end and a second end;
   a first end ring coupled to the first end of each of the bars; and
   a second end ring coupled to the second end of each of the bars, wherein each magnet slot includes a first end portion, a second end portion, and a magnet-receiving portion between the first end portion and the second end portion, the first end portion and the second end portion being devoid of any magnets and electrically-conductive material, and wherein the second end portion is larger than the first end portion.

2. The electric machine of claim 1, wherein the rotor core includes a plurality of laminations stacked along the longitudinal axis.

3. The electric machine of claim 1, wherein a portion of the bar apertures include a first end that is arcuate, a second end radially inward of the first end that is substantially linear, a first bar edge, and a second bar edge that is not parallel to the first bar edge, the first bar edge and the second bar edge connecting the first end and the second end.

4. The electric machine of claim 3, wherein a portion of the flux barriers include a substantially linear first end, an arcuate second end radially inward of the first end, a first barrier side and a second barrier side, the first barrier side and the second barrier side connecting the first end and the second end, the first bar edge and the first barrier side being substantially parallel to one another and the second bar edge and the second barrier side being substantially parallel to one another.

5. The electric machine of claim 1, wherein the first end portion cooperates with an aperture to define a magnetic bridge having a bridge axis that is substantially coincident with a radial axis of the rotor core.

6. The electric machine of claim 1, wherein the plurality of conductive bars, the first end ring, and the second end ring are cast as a single component.

7. The electric machine of claim 1, wherein the flux barriers contain a non-magnetic material.

8. An electric machine comprising:
   a stator;
   a rotor core positioned adjacent the stator and rotatable about a longitudinal axis, the rotor core including a plurality of bar apertures, a plurality of elongated flux barriers separate from the bar apertures and positioned radially inward of the bar apertures, and a plurality of magnet slots separate from the bar apertures and positioned radially inward of a portion of the bar apertures;
   a plurality of magnets, each positioned in one of the magnet slots;
   a plurality of conductive bars each positioned in one of the bar apertures and including a first end and a second end;
   a first end ring coupled to the first end of each of the bars; and
   a second end ring coupled to the second end of each of the bars, wherein the rotor core defines an inter polar axis and a center pole axis that is positioned at about 90 electrical degrees to the inter polar axis, and wherein one bar aperture is positioned on each of the inter polar axis and the center pole axis and are different than the remaining bar apertures.

9. The electric machine of claim 8, wherein the inter polar axis separates two adjacent poles each having a first end, and wherein at least two bar apertures are positioned between the first ends of the adjacent poles.

10. The electric machine of claim 8, wherein the bar apertures positioned on the inter polar axis and the center pole axis include an outer edge that is arcuate, an inner edge that is arcuate, a first side edge, and a second side edge that is not parallel to the first side edge, the first side edge and the second side edge connecting the inner edge and the outer edge.

11. An electric machine comprising:
    a stator;
    a rotor core positioned adjacent the stator and rotatable about a longitudinal axis, the rotor core defining an inter polar axis and a center pole axis that is oriented at about 90 electrical degrees with respect to the inter polar axis;
    a plurality of first bars each positioned within one of a plurality of first bar apertures formed in the rotor core, each of the bars extending in a direction substantially parallel to the longitudinal axis and including a first end and a second end;
    a plurality of second bars different than the first bars, each bar positioned within one of a plurality of second bar apertures formed in the rotor core, a portion of the second bars positioned on one of the inter polar axis and the center pole axis, each of the bars extending in a direction substantially parallel to the longitudinal axis and including a first end and a second end;
    a plurality of magnet slots formed as part of the rotor core and positioned radially inward of the first bar apertures, the second bar apertures extending between adjacent magnet slots, the first bar apertures and the second bar apertures being separate from the magnet slots; and
    a plurality of magnets, each of the magnets disposed in one of the magnet slots, wherein the rotor core defines a plurality of elongated flux barriers separate from the first bar apertures, the second bar apertures, and the magnet slots and positioned radially inward of the first bar apertures.

12. The electric machine of claim 11, wherein the rotor core includes a plurality of laminations stacked along the longitudinal axis.

13. The electric machine of claim 11, wherein the first bar apertures include a first end that is arcuate, a second end radially inward of the first end that is substantially linear, a first bar edge, and a second bar edge that is not parallel to the first bar edge, the first bar edge and the second bar edge connecting the first end and the second end.

14. The electric machine of claim 11, wherein the second bar apertures include an outer edge that is arcuate, an inner edge that is arcuate, a first side edge, and a second side edge that is not parallel to the first side edge, the first side edge and the second side edge connecting the inner edge and the outer edge.

15. The electric machine of claim 11, wherein each magnet slot includes a first end portion, a second end portion that is larger than the first end portion, and a magnet-receiving portion between the first end portion and the second end portion, the first end portion and the second end portion being devoid of any magnets.

16. The electric machine of claim 11, further comprising a first end ring coupled to the first end of each of the first bars and the first end of each of the second bars, and a second end ring coupled to the second end of each of the first bars and the second end of each of the second bars.

17. The electric machine of claim 16, wherein the first bars, the second bars, the first end ring, and the second end ring are cast as a single component.

18. The electric machine of claim 11, wherein a portion of the flux barriers include a substantially linear first end, an arcuate second end radially inward of the first end, a first barrier side and a second barrier side, the first barrier side and the second barrier side connecting the first end and the second end.

19. The electric machine of claim 11, wherein the flux barriers contain a non-magnetic material.

20. The electric machine of claim 11, wherein a second inter-polar axis cooperates with the inter-polar axis to define a pole, and wherein the magnets positioned within the pole are arranged to define an included electrical angle between about 120 degrees and 165 degrees.

* * * * *